United States Patent [19]

Ono et al.

[11] Patent Number: 4,637,703

[45] Date of Patent: Jan. 20, 1987

[54] FILM PACK

[75] Inventors: Minoru Ono; Teruyoshi Makino, both of Minami-ashigara, Japan

[73] Assignee: Fuji Photo Film Co., Ltd., Kanagawa, Japan

[21] Appl. No.: 766,964

[22] Filed: Aug. 19, 1985

[30] Foreign Application Priority Data

Aug. 17, 1984 [JP] Japan ................................ 59-171173

[51] Int. Cl.[4] ........................ B65D 85/67; G03B 17/26

[52] U.S. Cl. .................................... 354/276; 206/316; 206/455

[58] Field of Search ........................ 206/316, 455, 456; 354/83-87, 275-277; 378/182, 183, 187, 188

[56] References Cited

U.S. PATENT DOCUMENTS 2,873,659 2/1959 Bing et al. ............................ 354/87

3,756,133 9/1973 Tone .................................. 206/455

FOREIGN PATENT DOCUMENTS 1073297 1/1960 Fed. Rep. of Germany ...... 354/277

*Primary Examiner*—William Price

*Assistant Examiner*—Jimmy G. Foster

*Attorney, Agent, or Firm*—Young & Thompson

[57] ABSTRACT

In an instant film pack of the type comprising a parallelepipedal housing having a flat top wall in which an exposure aperture is defined by a rectangular frame, and a pressure plate for urging instant film units obtained in the film pack against the frame for exposure. Structure is provided to prevent the surface of the film unit from receiving scratch marks when the film unit is withdrawn from the film pack. The scratch mark preventing structure comprises a plurality of prismatic protuberances arranged in a line transverse to the direction of film movement on the underside of the rear edge of the exposure aperture, the protuberances having ridge lines parallel to the direction of film movement.

10 Claims, 4 Drawing Figures

FILM PACK

BACKGROUND OF THE INVENTION

The present invention relates to a film pack in which film units are contained and removably held, and more particularly to an improved film pack which allows withdrawing the film unit without producing scratch marks on the surface of the film unit on which an emulsion layer is formed.

Certain types of instant film units of the diffusion transfer type are generally contained in a film cassette or film pack in stacked relation and are removably held therein. Subsequent to exposure, a film unit will be withdrawn from the film pack and then the surface of the film unit on which an emulsion layer formed is brought into slidable contact with an inner surface of an exposure frame of the film pack. Especially a peel-apart type instant film unit, which comprises separate negative and positive sheets, is designed to superpose the separate sheets relative to each other after exposure for diffusion transfer processing. For this purpose, the negative sheet is turned through 180° while being withdrawn. During the 180° turn, the negative sheet is forced to slide against the inner surface of the exposure frame owing to the stiffness of the negative sheet, so as to produce an increased contact pressure therebetween. Therefore, there is a high risk of scratching the image area of the negative sheet.

For preventing the negative sheet from being scratched, the film packs heretofore used have been provided with projection members engageable with lateral margins of the negative sheet outside the image area of the negative sheet. However, when the negative sheet is elastically deformed as it is moved, the deformed part of the negative sheet is forced into contact with the structure of the film pack with a high contact pressure, which produces scratch marks on the negative sheet. Such scratch marks, which are often deep and wide, have considerable effect on the printed image on the positive sheet, resulting in a poor photograph.

OBJECTS OF THE INVENTION

It is therefore an object of the present invention to provide an improved film pack for containing and slidably holding a plurality of instant film units therein.

It is another object of the present invention to provide a film pack which is provided with means for preventing scratch marks on a film unit.

It is still another object of the present invention to provide a film pack which can prevent the photosensitive surface of a film unit from receiving scratch marks when the film sheet is withdrawn from the film pack.

It is a further object of the present invention to provide a film pack in which scratch mark prevention means can be formed integrally therewith.

SUMMARY OF THE INVENTION

To achieve the above-mentioned objects, there is provided, according to the present invention, a film cassette or pack having a generally parallelepipedal housing including a pressure plate therein, in which a plurality of instant units such as those of the peel-apart type or the mono-sheet type are contained in stacked relation. The housing includes a flat top wall in which an exposure aperture is defined by a rectangular frame against which the foremost film unit is pressed by the pressure plate. The housing is provided with means for scratch mark prevention which is integral with part of the structure of the film pack.

In accordance with one preferred embodiment of the present invention, the scratch mark prevention means is formed integrally with the frame against which the film units is pressed. Specifically, the scratch mark prevention means comprises a linear arrangement of a plurality of tapered projections, such as prismatic protuberances, spaced apart very small distances.

In accordance with the provision of the scratch mark prevention means comprising a plurality of tapered projections, contact pressure exerted on the film unit by the exposure frame can be equally distributed crosswise of the film unit so as to decrease the change of producing scratch marks on the film unit. As a result, an excellent printed image can be obtained.

BRIEF DESCRIPTION OF THE DRAWINGS

The above and other objects and features of the present invention will become more apparent to those skilled in the art from the following detailed description with reference to the accompanying drawings, in which.

DETAILED DESCRIPTION OF THE INVENTION

Figure 1:
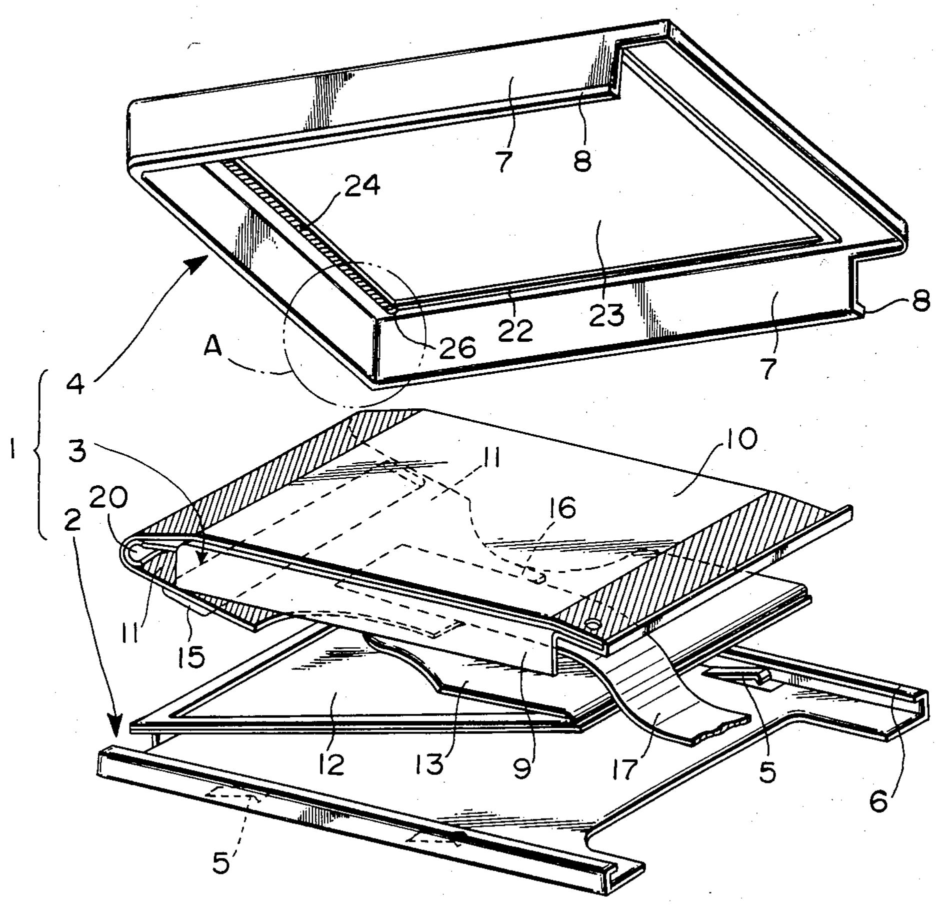
FIG. 1 is an exploded perspective view of a film pack in accordance with the present invention.

Referring now to FIG. 1, shown therein in an exploded perspective view is a generally parallelepipedal film pack 1 embodying the present invention. The film pack 1 comprises a base 2 formed of thin resilient sheet metal, a top housing 4 formed of, for example, a high-impact polystyrene material and pressure plate 3 made of a sheet metal. The base 2 is provided with spring tabs 5 and inwardly turned longitudinal flanges 6. The top housing 4 is provided with downwardly extending, longitudinal side walls 7 having outwardly turned longitudinal flanges 8 adapted to resiliently engage the flanges 6 for forming the film pack 1 so as to enclose the pressure plate 3 and a plurality of film units therein. The spring tabs 5 are bent upwardly and are adapted to resiliently engage downwardly extending longitudinal walls 9 on the pressure plate 3 for urging the pressure plate 3 upwardly. The top housing 4 includes a generally rectangular flat wall in which an exposure aperture 23 is defined by a downward rectangular frame 22 for allowing scene light to pass therethrough.

A film unit contained in the film pack basically includes a negative sheet 10 comprising any of the commonly used flexible sheet materials, positive sheet 12 also comprising a conventional flexible sheet material and a carrier sheet comprising a first sheet 11 and a second sheet 13. The first sheet 11 with its trailing end connected to the negative sheet 10 is adapted to function as a leader. The second sheet 13 has a leading section connected to the middle of the first sheet 11 and a trailing section which comprises a mask for confining a processing liquid between the negative and positive sheets 10, 12. The carrier sheet is adapted to function as a leader for connecting the negative and positive sheets 10, 12, properly registering the sheets 10, 12 relative to each other when the sheets 10, 12 are superposed, and supporting a pod 15 containing a processing liquid. The negative sheet 10 is placed on the flat surface of the pressure plate 3 and the first sheet 11 of the carrier sheet passes around a curved portion 20 formed at one end of the pressure plate 3 and extends behind the rear thereof. The positive sheet 12 and the second sheet 13 of the carrier sheet bearing the positive sheet 12 are accommodated in a space formed between the pressure plate 3 and the base 1. In the same way as described above, a plurality of the peel-apart type instant film units are contained in the film pack 1 in stacked relation, and the foremost negative sheet 10 is pressed against the frame 22 so as to be positioned for exposure. The positioning of the foremost negative sheet 10 is effected through the engagement between the spring tabs 5 and the downwardly extending walls 9 of the pressure plate 3.

Figure 2:
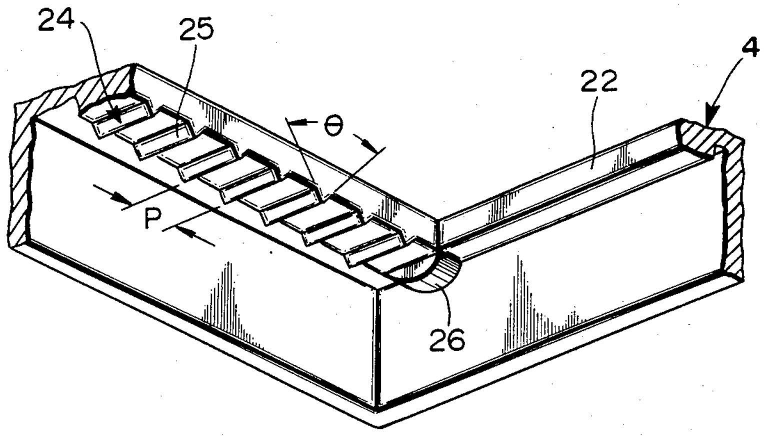
FIG. 2 is a fragmentary enlarged perspective view showing in detail the part encircled by the phantom line in FIG. 1.

As means for preventing the emulsion layer of the negative sheet 10 from receiving scratch marks when the negative sheet 10 passes around the curved portion 20 of the pressure plate, there is provided a linear arrangement 24 of protuberances 25 on the under surface of one side of the rectangular frame 22. As shown in FIG. 2, which illustrates in detail a part of the protuberance arrangement which is encircled by the phantom line A in FIG. 1, each protuberance has a prismatic configuration with a vertical included angle $\theta$ of 90°, and is formed to extend in a direction parallel to the direction of movement of the negative sheet 10 which will be described later. The prismatic protuberances 25 are arranged with a separation distance P of 0.6 mm. At both ends of the prismatic protuberance arrangement, there are provided semicircular projections 26 which are adapted to slidably engage the lateral margins of the negative sheet 10.

Figure 3:
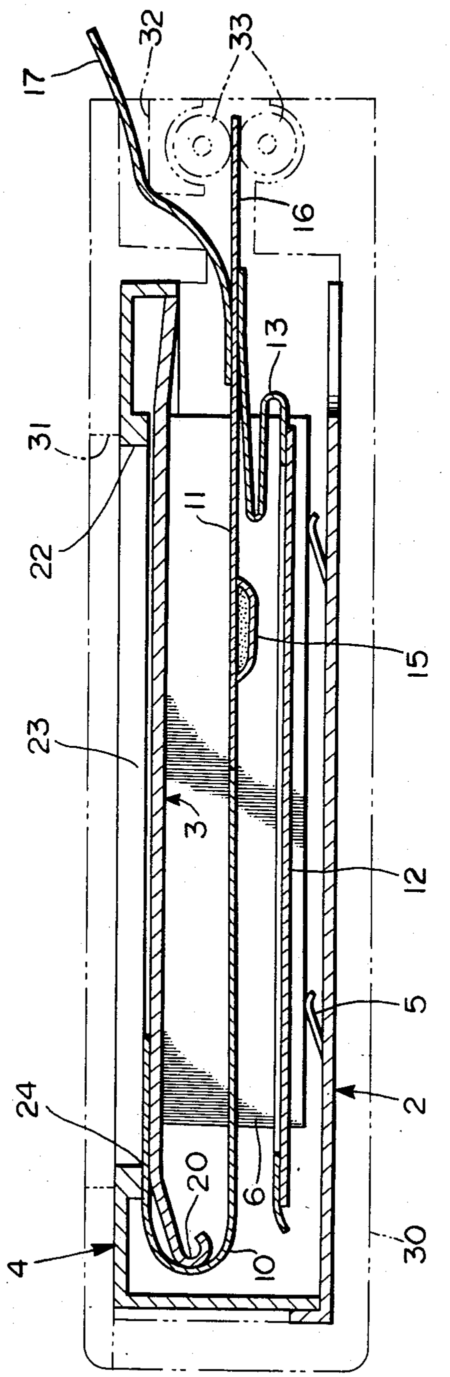
FIG. 3 is a longitudinal sectional view of a film pack loaded in a camera back and holding a single film unit.

Reference is now had to FIG. 3 which illustrates the film pack having been loaded in a camera back 30 and holding a single film unit. As is well known in the art, the camera back 30 is provided with an opening 31 for allowing scene light to reach the negative sheet 10. An objective (not shown) can focus image-forming light from the scene to be photographed onto the negative sheet through the opening 31 and the exposure aperture 23. The camera back 30 further includes an exit 32 through which the pull tab 17 and hence the film unit is withdrawn from the film pack for processing, and a pair of pressure-applying members in the form of elongated rollers 33 mounted therein for applying compressive pressure to the negative and positive sheets so as to distribute processing liquid between the superposed sheets as the sheets are moved. It should be noted in FIG. 3 that the negative sheet 10 has been withdrawn to some extent subsequent to exposure.

For obtaining a printed image on the positive sheet 12 by the diffusion transfer process which takes place outside the camera back 30, the pull tab 17 is withdrawn through the exit 32 in order to advance the carrier sheet so that the leading end 16 of the first sheet enters between the pressure applying rollers 33. When the pull tab 17 is further withdrawn, the leading end 16 projects outside the camera back 30 to allow access thereto for withdrawal, while the pull tab 17 is disconnected from the first sheet 11. By withdrawing the leading end 16 continuously, the negative and positive sheets 11 and 12 are advanced between the pressure applying rollers 33 and superposed in proper registry relative to each other. As a result, the pressure-applying rollers 33 compressively rupture the pod 15 to release the processing liquid, and distribute the processing liquid between the negative and superposed positive sheets 10, 12 as the sheets are advanced for spreading the processing liquid in a thin, uniform layer. After a certain time after the film unit has been fully withdrawn from the camera back 30, the negative sheet 10 is peeled apart from the positive sheet 12. The same operation is repeated for each film unit.

For an understanding of the scratch mark prevention means, the following description is given. When the negative sheet 10 which is pressed against the aperture frame 22 with the pressure plate 3 urged upwardly by the spring tabs 5 is withdrawn, the photosensitive surface of the negative sheet 10 comes into sliding contact with the ridge lines of the protuberances 25. Owing to a certain measure of stiffness of the negative sheet 10, the negative sheet 10 has considerable resilience so that the protuberances 25 exert an increased contact pressure on the negative sheet 10 passing around the curved portion 20 at the end of the pressure plate 3, i.e., making a turn of 180°. As mentioned hereinbefore, since the prismatic protuberances 25 are separated only by very small distances so as to uniformly contact the negative sheet 10, the contact pressure exerted crosswise on the negative sheet 10 is uniformly distributed. The uniform distribution of contact pressure results in a decreased chance of scratching the photosensitive surface of the negative sheet 10. Furthermore, since the ridge line of each protuberance 25 is sharp, scratch marks on the negative sheet 10, if produced, are too thin to be distinguishable on the printed image on the positive sheet 12.

Figure 4:
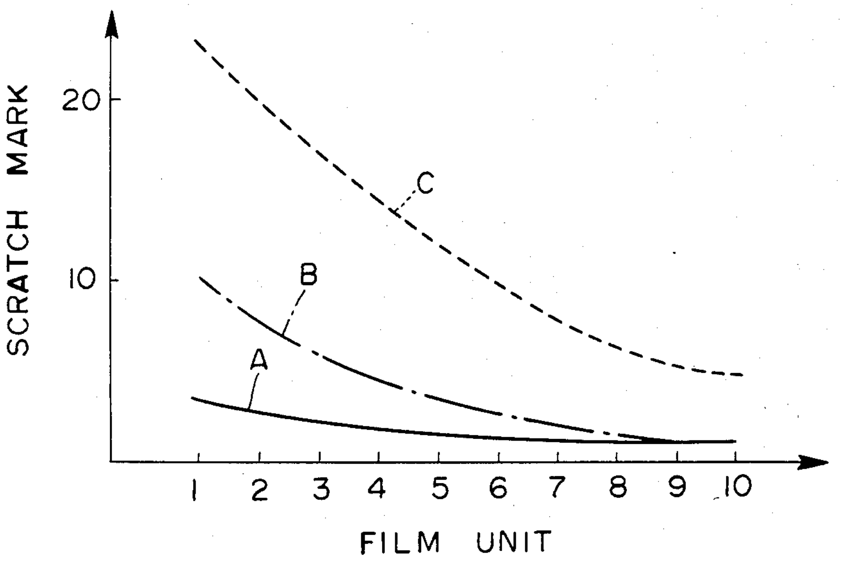
FIG. 4 is a graph of curves showing the relation between the number of scratch marks on successive film units and the number of film units that have been withdrawn, for two film packs according to the invention and a film pack according to the prior art.

Reference is now had to FIG. 4, which illustrates the relations between the number of film units withdrawn from the film pack and the number of visible scratch marks on the positive sheets, for understanding the results of the invention. The practical results achieved by this invention are shown by the curve A for the provision of the linear arrangement 24 of prismatic protuberance 25 and the semicircular projections 26 and the broken line B for the case when the semicircular projections 26 are omitted. On the other hand, the dashed line C indicates the results obtained when a conventional film pack is used. As will be understood from the difference between the curves (A), (C) and (B), (C), shown in FIG. 4, the film pack of this invention gives considerably reduced numbers of visible scratch marks on the positive sheets of film units withdrawn therefrom, in comparison with the conventional film pack. As is apparent from curve B, the result of the provision of only the linear arrangement 24 of the prismatic protuberances 25 is also a marked improvement. It is evident from the relations shown in FIG. 4 that the number of scratch marks produced on a positive sheet is reduced as the number of film units remaining in a film pack. This reduction results from decreased contact pressure between the foremost negative sheet 10 and the exposure frame 23, i.e., the reduction of the force exerted by the pressure plate 3.

As will be understood from the above description, the provision of prismatic protuberances contributes to a considerable reduction in the number of scratch marks on the negative sheet which is in contact with the exposure frame.

The number of the prismatic protuberances 25 and the vertical angle $\theta$ should be chosen considering related factors, for example, the stiffness of the negative sheet, the force exerted by the pressure plate, and the like. Especially in the case of a film pack containing the peelapart type color instant film units described in the above embodiment, satisfactory results are obtained when the pitch P of the protuberances is not more than about 1 mm and preferably less, and the vertical angle $\theta$ is also not more than about 90° and preferably less.

The most desirable location for the arrangement of the prismatic protuberances is the under surface of the exposure frame where a high contact pressure is exerted on the emulsion surface of negative sheet 10.

The end of the protuberance first encountered by the film can be tapered. Furthermore, a great number of small pyramidal or conical projections may be distributed either regularly or at random instead of arranging prismatic protuberances whose ridge lines extend in the direction of movement of the negative sheets.

What is claimed is:

1. A film pack for containing and removably holding a plurality of instant film sheets, each of said instant film sheets having an emulsion layer on its one surface, said film pack comprising:

- a parallelepipedal housing having a flat top wall having an exposure aperture therein;
- a pressure plate contained in said housing for urging said instant film sheets against the inner surface of said flat top wall for exposure; and
- means for preventing said emulsion surface from receiving scratch marks, said means comprising a plurality of tapered projections arranged on a part of said housing with which said emulsion surface is in slidable contact when each said instant film sheet is withdrawn from said housing after exposure, said tapered projections have ridge lines extending in the direction of movement of said instant film sheets.

2. A film pack as claimed in claim 1, in which said tapered projections are prismatic protuberances.

3. A film pack as claimed in claim 2, in which said prismatic protuberances have a vertical angle not more than about 90°.

4. A film pack as claimed in claim 2, in which said prismatic protuberances have a vertical angle less than 90°.

5. A film pack as claimed in claim 1, in which said tapered projections are disposed in a line perpendicular to the direction of movement of said instant film sheets.

6. A film pack as claimed in claim 5, in which said tapered projections have an interval of not more than about 1 mm.

7. A film pack as claimed in claim 6, in which said interval is less than 1 mm.

8. A film pack as claimed in claim 5, in which said line of projections is disposed on the undersurface of one side of said exposure aperture adjacent which said instant film sheets are forced to turn through 180° during withdrawal from said housing.

9. A film pack as claimed in claim 1, in which said tapered projections are formed integrally with said flat top wall.

10. A film pack as claimed in claim 9, in which said tapered projections are disposed along the rear edge of said exposure aperture relative to the direction of movement of said instant film sheets.

* * * * *